Dec. 26, 1933. A. THIRIET ET AL. Re. 19,036

PREPARATION OF ROSIN SOLUTIONS

Original Filed June 21, 1926

INVENTORS:
André Thiriet
and Pierre Delcroix
By Louis Gouniel & Ch
ATTORNEY

Reissued Dec. 26, 1933 Re. 19,036

UNITED STATES PATENT OFFICE 19,036

PREPARATION OF ROSIN SOLUTIONS

André Thiriet and Pierre Delcroix, Voiron, France, assignors, by mesne assignments, to Procedes Navarre, Lyon, France Original No. 1,759,526, dated May 20, 1930, Serial No. 117,621, June 21, 1926. Application for reissue June 13, 1931. Serial No. 544,249

4 Claims. (Cl. 134—21)

The present invention relates to a process of making solutions of sodium resinate without the application of heat. The solutions obtained according to this process are particularly useful for sizing paper or cardboard, but also can be used generally in all cases in which rosin suspensions or rosin soap (which have been previously obtained through the medium of a thick alkali soap prepared by a hot process) are required. The color lacquers and pigment industries, for example are among those requiring these products.

The essential feature of the process according to our invention consists in that the intermediate stage of making a thick soap is rendered unnecessary, by causing a cold solution of soda to act directly upon rosin, either (*a*) by passing a cold solution of caustic soda over the rosin or (*b*) by mixing crushed rosin with a suitable quantity of caustic soda.

By our process, clear solutions of sodium resinate may be obtained at will from the reaction caused by passing a cold caustic soda solution over rosin. It is possible to produce the reaction with all materials in the cold state and to obtain a satisfactory yield with a low concentration of less than 10 grammes of caustic soda per liter.

Figure 1:
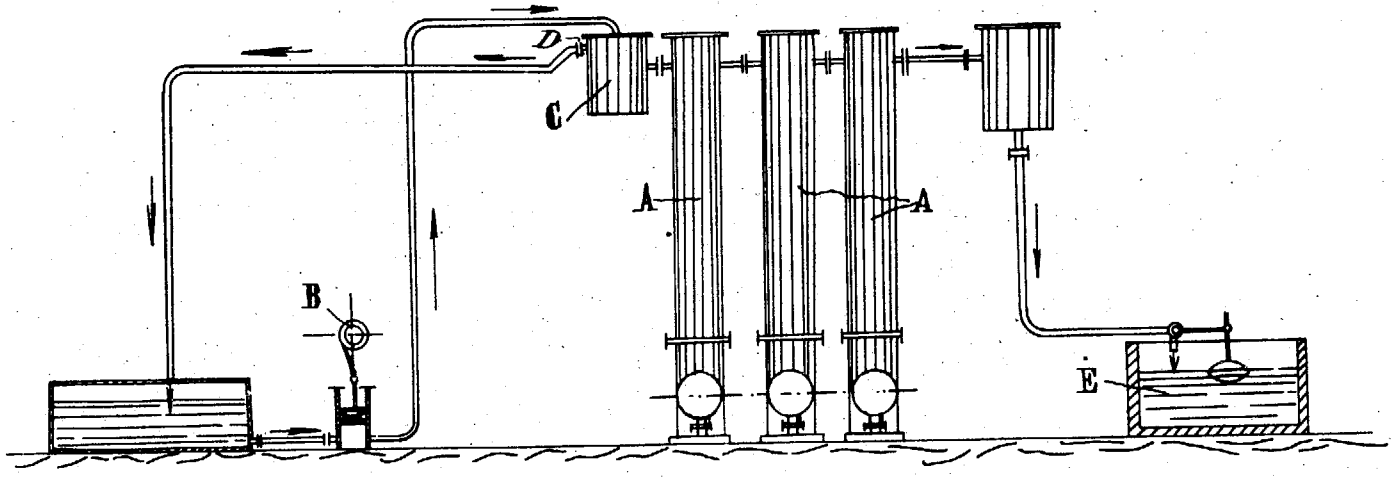
Figure 2:
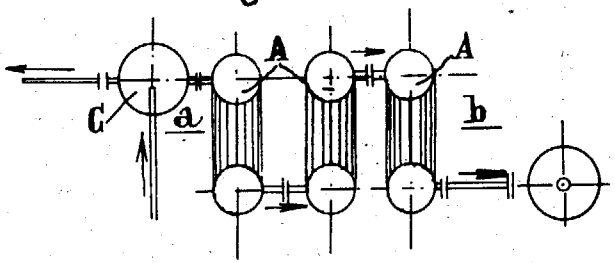

In the accompanying drawing which shows by way of example one of many possible apparatus that may be used with advantage for dissolving rosin according to the present process, Fig. 1 is a vertical section of the apparatus taken on line *a*—*b* of Fig. 2, which latter is a fragmental plan view.

A caustic soda solution is passed in succession through vertical columns A filled with pieces of rosin. The number, diameter and height of the columns vary in accordance with the quantity of solution to be obtained. A clear solution of sodium resinate with a uniform proportion of rosin per liter is obtained in this manner. The caustic soda solution is supplied to the apparatus by means, for example, of a pump B, the rate of supply of which is uniform with each case. In the apparatus illustrated, the caustic soda solution is pumped into a receptacle C having an overflow D, and then passes through the columns, whereafter it reaches a container E for storing the sodium resinate solution. Separate devices may be provided for the purpose of automatically discontinuing the supply of caustic soda solution when the container E is full.

Our process of obtaining sodium resinate solutions directly (without the intermediate stage of making a thick soap) may also be effected by suitably agitating a mixture of water, caustic soda and crushed rosin in suitable proportions, for instance about 14 grammes of caustic soda to 100 grammes of rosin together with the required quantity of water, in case a clear solution is wanted.

In either case the reaction of the cold caustic soda upon the rosin may be expressed as follows: $(C_{18}H_{28})COOH$ plus NaOH equals $(C_{18}H_{28})COONa$ plus $H_2O$.

In any case the proportions may be varied. If an excess of caustic soda is used it will remain mixed with the sodium resinate produced. If an excess of rosin is supplied in lumps or in crushed or powdered form, it may remain as lumps, sediment or in colloidal suspension in the sodium resinate, as the case may be.

We claim as our invention:

1. The process which comprises the single step of passing a cold solution of caustic soda having a concentration of less than 10 grammes per liter directly over pieces of rosin, so as to obtain a true solution of sodium resinate immediately from such treatment.

2. A continuous process of producing sodium resinate solutions, comprising the single step of passing a cold dilute solution of caustic soda over roughly-ground rosin, so as to obtain a true solution of sodium resinate immediately from such treatment.

3. A process comprising causing a cold dilute solution of caustic soda to act upon rosin, so as to directly obtain a true solution of sodium resinate.

4. A process comprising passing a cold dilute solution of caustic soda in water over rosin, so as to obtain a freely flowing true solution of sodium resinate.

ANDRÉ THIRIET.
PIERRE DELCROIX.